Sept. 20, 1949. K. A. BROWNE ET AL 2,482,461
ENGINE COOLING SYSTEM
Filed July 26, 1943
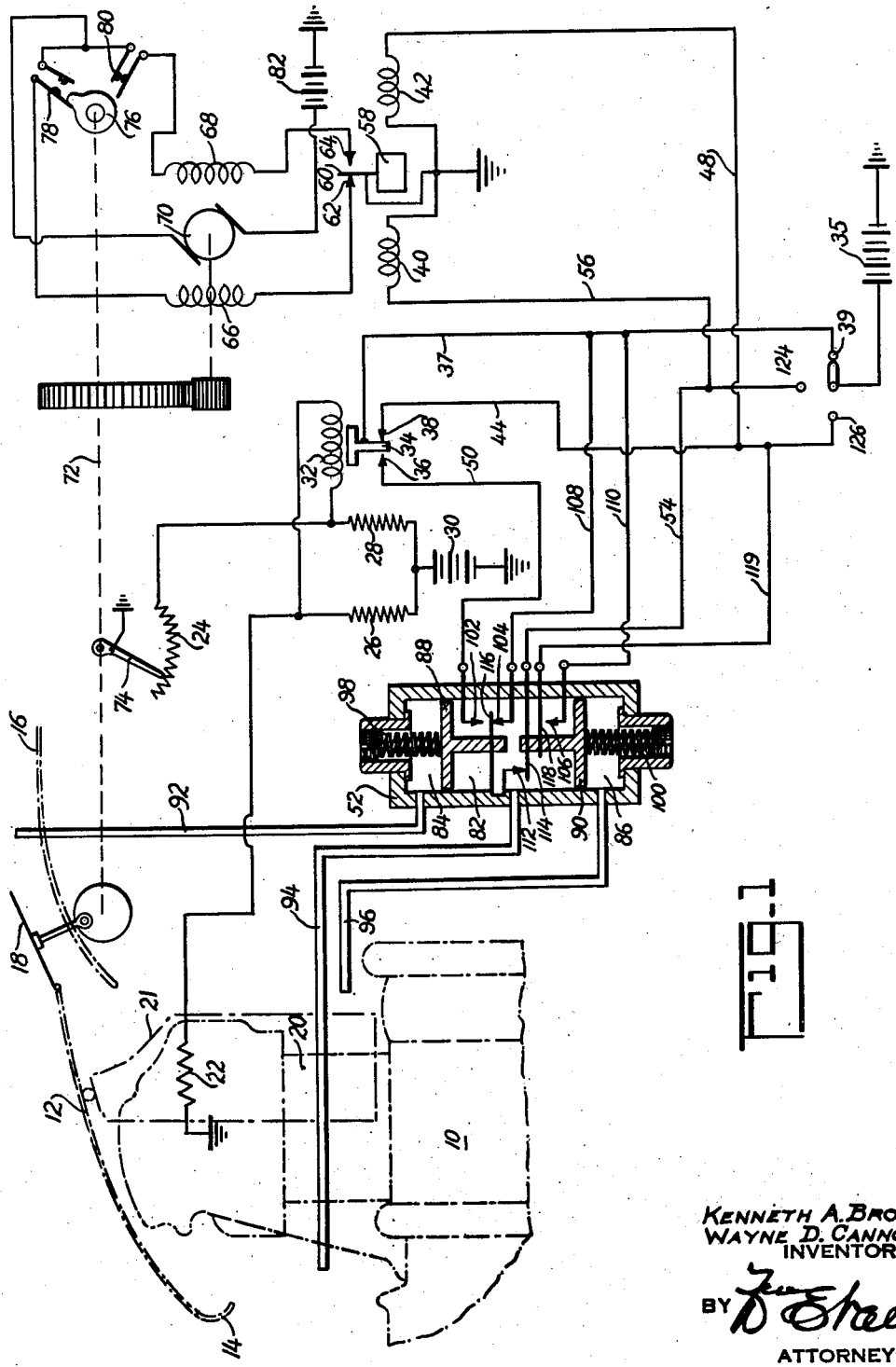
KENNETH A. BROWNE.
WAYNE D. CANNON.
INVENTORS.
BY
ATTORNEY Patented Sept. 20, 1949

2,482,461

UNITED STATES PATENT OFFICE 2,482,461

ENGINE COOLING SYSTEM

Kenneth A. Browne, Ridgewood, and Wayne D. Cannon, Hohokus, N. J., assignors to Wright Aeronautical Corporation, a corporation of New York Application July 26, 1943, Serial No. 496,236

8 Claims. (Cl. 123—171)

1

This invention relates to temperature control of air-cooled engines and is particularly directed to automatic control of the cooling airflow over the engine cylinders.

It is an object of the invention to provide an automatic system for controlling the cowl flaps of an aircraft engine and which substantially duplicates the best flap positions as set by a competent pilot under various flight conditions. As far as aircraft engine operation is concerned a fixed full-open cowl flap position would be preferable but the drag created at high aircraft speeds by the fully opened cowl flaps is prohibitive. Therefore the best flap position for a given set of flight conditions is a compromise between the cooling requirements of the engine and the aerodynamic efficiency of the aircraft. It has been found that the engine life or durability is increased by operating below the specified maximum operating temperatures. Accordingly, the engine should be maintained at as low a temperature as is permissible without increasing the over all operating cost because of the extra power required to furnish the cooling. The cooling drag horsepower required to maintain sub-maximum cylinder head temperatures is nominally small when normal or sub-normal atmospheric temperatures are encountered, however at above normal atmospheric temperatures, this drag power increases inordinately out of proportion to the advantages accruing from holding the low cylinder temperatures, and it is essential to allow the cylinders to operate toward or at the maximum temperature limits.

In the conventional manual flap operation by the pilot the flaps are fully opened for ground running and during climb the flaps generally are placed in an intermediate position, except on hot days when the flaps may be fully opened. During cruising conditions the flaps are either closed or opened slightly if the engine temperature becomes excessive. During descent the flaps are closed but after landing the flaps are fully opened. It is an object of this invention to provide an automatic control which generally will follow this manual procedure.

It is a further object of this invention to provide a modulating type of automatic temperature control of the cowl flaps in which the flaps begin to open at a temperature approximately 125° F. below the maximum operating temperature limit of the engine and are fully opened at this maximum temperature limit. It is a further object of this invention to modify the temperature control of the cowl flaps such that their maximum opening is determined by the magnitude of the cooling airflow over the engine. Thus, it is an object of this invention to permit the flaps to remain fully opened during climb if this is required by the engine temperature but with increase in the indicated air speed of the aircraft the maximum permissible flap opening is gradually decreased such that the pressure drop of the cooling airflow across the engine cylinders does not exceed a predetermined value regardless of the temperature of the engine. In addition, it is a further object of this invention to provide means to insure that the flaps are fully opened when the aircraft is on the ground. It is a further object of this invention to provide manual means operable to override the automatic control of the cowl flaps in order to meet such emergency conditions as may arise.

Other objects of this invention will become apparent upon reading the annexed detailed description in connection with the drawing which is a schematic layout of the invention.

Referring to the drawing the conventional radial cylinder air-cooled aircraft engine indicated at 10 is provided with an annular cowling 12 having an inturned leading edge portion 14 defining a cooling air entrance opening. Rearward of the front cowling 12 is a second cowling 16 having an inturned leading edge portion spaced from the trailing edge portion of the front cowling and having its rearward extension providing streamlined continuation of the cowling. The annular space between the front and rear cowling members provides an air exit opening controlled by a plurality of cowl flaps 18 hinged to the trailing edge of the front cowling. In addition, the spaces between the radially disposed engine cylinders 20 are provided with baffles 21 fitted to the finned periphery of the cylinders between the cylinders in order to confine the cooling airflow to the cylinder fins. The engine and cowling structure so far described is conventional.

The temperature control of the cowl flaps 18 comprises a conventional modulating type control circuit. A temperature responsive resistance 22 is suitably disposed so as to be responsive to the engine cylinder head temperature. This resistance forms one arm of a Wheatstone bridge circuit and an adjustable resistance 24 forms the opposing arm of this bridge circuit. One end of each of the resistances 22 and 24 is grounded while their other ends are connected to the fixed resistances 26 and 28, respectively, and thence to a source of electric energy 30. A suitable control relay winding 32 is connected across the junction of the resistances 22, 26 and 24, 28.

The Wheatstone bridge circuit is arranged to close the relay contacts 34 and 36 upon an increase in the resistance 22 because of a rise in the engine temperature and to close the contacts 34 and 38 upon a decrease in the resistance 22. The control relay contacts 36 and 38 are connected to motor relay windings 40 and 42, respectively and the central control relay contact 34 is connected to a source of electric energy 35 through the line 37 and switch contact 39. The connection between the control relay contact 38 and the motor relay winding 42 includes the wires 44 and 46 while the connection between the control relay contact 36 includes the wire 50, appropriate contacts in a pressure responsive element 52, and wires 54 and 56. The construction and operation of the pressure responsive element 52 is hereinafter described.

Motor relay windings 40 and 42 are adapted to control the position of the associated movable armature 58 to close switch contacts 60 and 62 or 60 and 64 to energize the motor directional field windings 66 or 68, respectively, of the motor 70 depending on the particular motor relay winding energized. The motor 70 is drivably connected to a cowl flap operating shaft 72 for operating the cowl flaps 18. In addition, the shaft 72 carries an arm 74 which is movable to adjust the resistance 24, whereby rotation of the motor 70 simultaneously adjusts the flaps 18 and the resistance 24. The shaft 72 is also provided with a cam 76 adapted to control suitable limit switches 78 and 80 connected in series with a source of energy 82, the motor 70, and the motor directional control windings 66 and 68, respectively. These limit switches determine the extent to which the cowl flap motor 70 may be operated in either direction, thereby defining the limiting positions of the cowl flaps. With the above described temperature control, upon an increase in the temperature of the engine the resistance 22 increases to unbalance the control relay 32 to close the contacts 34 and 36. A circuit may then be completed to the motor relay winding 40 provided appropriate contacts are closed in the pressure responsive element 52. Thereupon the motor 70 is energized to open the cowl flaps 18 and at the same time the resistance 24 is adjusted to rebalance the bridge circuit. The motor 70 continues to operate to open the flaps until the bridge is rebalanced, whereupon, the control relay 32 is de-energized thereby de-energizing the motor 70. With a drop in temperature of the engine the decrease in the resistance 22 unbalances the bridge circuit so as to close contacts 34 and 38 of the control relay 32. Thereupon the motor relay winding 42 is energized and the motor 70 operates to move the flaps in a closing direction until the simultaneous rebalancing adjustment of the resistance 24 rebalances the bridge circuit.

Any suitable modulating type of temperature control circuit or apparatus may be used. Thus, other means may be provided to control the operation of the switch contact 34 in response to the temperature of the engine and the adjustment of the cowl flaps 18 may be operative to effect a follow-up movement of the contacts 36 and 38 to determine the extent of the adjustment of the cowl flaps in accordance with the magnitude of the change in temperature of the engine. The essential requirements of the temperature control is that the cowl flaps have a certain definite position dependent on the engine temperature instead of attempting to maintain a constant engine temperature.

The pressure responsive element 52 comprises a housing having a central chamber 82 and a pair of end chambers 84 and 86 formed by the movable members 88 and 90. The end chamber 84 is subjected to the static air pressure outside the engine cowling through a conduit 92. The central chamber 82 is subjected to the impact air pressure in front of the engine through a conduit 94 and the end chamber 86 is subjected to the impact air pressure immediate to the rear of the engine cylinders through a conduit 96. With this construction, for the purpose of this invention, the pressure differential across the member 88 is a sufficiently accurate measure of indicated air speed of the aircraft. In addition, the pressure differential across the movable member 90 is equal to the so-called baffle pressure drop across the engine cylinders, or is a measure of the rate of the cooling airflow over the cylinders. Manually adjustable springs 98 and 100 balance the pressure differentials acting against the movable members 88 and 90, respectively. As illustrated in the drawing, the movable members 88 and 90 comprise slidable piston-like members but it seems clear that flexible diaphragms may be substituted therefor.

The housing of the pressure responsive element 52 is provided with a fixed contact 102 connected to the line 50, fixed contacts 104 and 106 connected to the switch contact 39 through the lines 108 and 110, respectively, and with a fixed contact 112. Fixed contact 112 is engageable with the resilient spring contact 114 connected to the line 54 and carried by the movable member 90 and this fixed contact is connected to the resilient spring contact 116 carried by the movable member 88 and engageable with the fixed contacts 102 or 104. A second resilient contact 118 is carried by movable member 90 and is connected to the line 44 and is engageable with the fixed contact 106.

At relatively low indicated air speeds the movable member 88 is moved downward by the spring 98 to close contacts 104 and 116 and the low baffle pressure drop results in an upward movement of the member 90 to close the contacts 112 and 114. A circuit is thereby completed to the motor relay winding 40 to open the flaps 18 independently of the automatic temperature control relay 32. This circuit includes the battery 35; switch terminal 39; lines 37 and 108; switch contacts 104, 116, 112, and 114; lines 54 and 56 to the windings 40. The contacts 104 and 116 are arranged to close when the indicated air speed, as measured by the pressure differential across the member 88, falls below approximately 75% to 90% of the stalling speed of the aircraft, thereby causing the cowl flaps to fully open while the aircraft is on the ground. When the indicated air speed, as measured by the pressure differential across the member 88, increases above 75% to 90% of the stalling speed of the aircraft the movable member 88 is moved upwardly by the differential pressure in chambers 82 and 84 against the bias of spring 98 to close the contacts 102 and 116 and to open the contacts 104 and 116. In this condition the contacts 36 and 38 are both connected to the motor relay windings 40 and 42 whereby the cowl flaps are subject to adjustment in either direction by the automatic temperature control system.

The movable element 90 is responsive to the differential air pressure across the engine cylinders; that is, to the so-called baffle pressure drop. When this differential pressure exceeds a predetermined value the element 90 is moved against its spring bias to open the contacts 114 and 112. With the cowl flaps fully opened the bias of the spring 100 is adjusted so that contacts 114 and 112 open approximately at the speed for maximum aircraft climb; that is, when the indicated air speed rises to approximately 175% of the stalling speed of the aircraft. Therefore, below this maximum climbing speed the temperature control is free to position the cowl flaps between its full opened and closed position in accordance with the engine temperature. But above this speed the maximum permissible opening of the cowl flaps is limited by the aforementioned predetermined baffle pressure drop. If the cowl flaps are fully opened and the engine speed is increased above the speed for maximum climb the resulting increase in the baffle pressure drop operates to close the contacts 118 and 106. This completes a circuit to the motor relay winding 42 to effect a closing adjustment of the cowl flaps 18. This circuit includes a battery 35, contact 39, lines 37 and 110, switch contacts 106 and 118, and lines 44, 46, and 48 to the winding 42. Similarly in any open position of the cowl flaps, if the baffle pressure drop increases above its limiting value, the contacts 118 and 106 close to effect a closing adjustment of the cowl flaps. In other words the element 90 is responsive to the baffle pressure drop to control the maximum open position of the cowl flap regardless of the engine temperature. That is, the maximum opened position of the cowl flaps is limited to that necessary for obtaining a predetermined rate of cooling airflow, but if the engine temperature is sufficiently cool the temperature control may close or adjust the cowl flaps as long as the cooling airflow does not exceed this predetermined limit.

Summarizing, the cowl flaps are maintained in an opened position below an indicated air speed less than 75% to 90% of the stalling speed of the aircraft and above this speed the cowl flaps may be adjusted throughout their entire range by the temperature control system up to approximately the speed for maximum climb. At higher speeds the extent to which the cowl flaps may be opened by the temperature control is such that the baffle pressure drop does not exceed a predetermined value regardless of the engine temperature. That is, at high speeds the extent of the flap opening is considerably restricted.

From the above description it is apparent that applicant has designed an automatic cowl flap control system which closely approximates the best possible flap position obtainable by manual operation under various flight conditions.

For emergency reasons it is desirable to provide means permitting manual control of the cowl flaps. For this purpose the battery 35 is connected with the contact 39 through a switch arm 122. This switch arm is also engageable with the contacts 124 and 126 which are connected to the motor relay windings 40 and 42, respectively. Therefore, when the the switch arm is disengaged from the contact 39 the automatic temperature control circuit is broken and if this switch arm is moved into engagement with the contact 124 the cowl flaps are moved toward their open position as long as the switch is maintained in this position and if the switch is moved to engagement with the contact 126 the cowl flaps are moved toward their closed position.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In a cooling control system for an air-cooled engine, means adjustable for regulating the cooling airflow over said engine means responsive to the temperature of said engine for effecting adjustment of said regulating means in an airflow increasing direction in response to an increase in engine temperature and vice versa, and means operative only in response to an increase in the magnitude of the engine cooling airflow above a predetermined value to effect an airflow decreasing adjustment of said regulating means irrespective of the engine temperature.

2. In a cooling control system for an air-cooled engine, means adjustable for regulating the cooling airflow over said engine, means responsive to the temperature of said engine for effecting adjustment of said regulating means such that there is a substantial engine temperature differential between the maximum and minimum airflow positions of said regulating means, and means operative only in response to an increase in the magnitude of the engine cooling airflow above a predetermined value to effect an airflow decreasing adjustment of said regulating means irrespective of the engine temperature.

3. A cooling control system for a multicylinder air-cooled engine having baffles disposed between said engine cylinders to restrict the airflow therebetween and having a cowl about said engine cylinders, said system comprising adjustable cowl flaps for controlling the cooling airflow over said cylinders, means responsive to the temperature of said engine for adjusting said flaps, and means operative only in response to an increase in the magnitude of the engine cooling airflow above a predetermined value to effect an adjustment of said cowl flaps in a closing direction irrespective of the engine temperature.

4. In an aircraft, an air-cooled engine therefore, means adjustable for regulating the cooling airflow over said engine, means responsive to the temperature of said engine for adjusting said regulating means, and means operatively connected to said regulating means and responsive to substantially the airspeed of said aircraft, within a low airspeed range including zero airspeed, for effecting adjustment of said regulating means to maximum airflow position when said airspeed is less than a predetermined value.

5. In an aircraft, an air-cooled engine therefor, means adjustable for regulating the cooling airflow over said engine, means responsive to the temperature of said engine for effecting adjustment of said regulating means in an airflow increasing direction in response to an increase in engine temperature and vice versa, means operatively connected to said regulating means and responsive to substantially the airspeed of said aircraft, within a low airspeed range including zero airspeed, for effecting adjustment of said regulating means to maximum airflow position when said airspeed is less than a predetermined value, and means operative only in response to an increase in the magnitude of the engine cooling airflow above a predetermined value to effect an airflow decreasing adjustment of said regulating means irrespective of the engine temperature.

6. In an aircraft, an air-cooled engine therefor, means adjustable for regulating the cooling airflow over said engine, means responsive to the temperature of said engine for effecting adjustment of said regulating means in an airflow increasing direction in response to an increase in engine temperature and vice versa, means operatively connected to said regulating means and responsive to substantially the air speed of said aircraft, within a low airspeed range including zero airspeed, for effecting adjustment of said regulating means to maximum airflow position when said airspeed is less than a predetermined value, and means operative only in response to an increase in the magnitude of the engine cooling airflow above a predetermined value to effect an airflow decreasing adjustment of said regulating means irrespective of the engine temperature or the aircraft airspeed.

7. In an aircraft, an air-cooled engine therefor, means adjustable for regulating the cooling airflow over said engine, means operatively connected to said regulating means and responsive to substantially the airspeed of said aircraft, within a low airspeed range including zero airspeed, for effecting adjustment of said regulating means to maximum airflow position when said airspeed is less than a predetermined value.

8. In a vehicle, an air-cooled engine therefor, means adjustable for regulating the cooling airflow over said engine, means responsive to the temperature of said engine for effecting adjustment of said regulating means in an airflow increasing direction in response to an increase in engine temperature and vice versa, and means operative only in response to an increase in the magnitude of the engine cooling airflow above a predetermined value to effect an airflow decreasing adjustment of said regulating means irrespective of engine temperature or vehicle air speed.

KENNETH A. BROWNE.
WAYNE D. CANNON.

REFERENCES CITED

The following references are of record in the file of this patent:

UNITED STATES PATENTS

| Number | Name | Date |
| --- | --- | --- |
| 2,150,143 | Adams | Mar. 14, 1939 |
| Re. 21,312 | Nissen | Jan. 2, 1940 |
| 2,246,498 | Blanding | June 24, 1941 |
| 2,384,088 | Hagen | Sept. 4, 1945 |